US 6,540,481 B2

(12) United States Patent
Moussa et al.

(10) Patent No.: US 6,540,481 B2
(45) Date of Patent: Apr. 1, 2003

(54) DIFFUSER FOR A CENTRIFUGAL COMPRESSOR

(75) Inventors: Zaher Milad Moussa, Salem, MA (US); Gilbert John Laidlaw, Gloucester, MA (US); David John Tapparo, Danvers, MA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/826,113

(22) Filed: Apr. 4, 2001

(65) Prior Publication Data
US 2002/0146320 A1 Oct. 10, 2002

(51) Int. Cl.⁷ ................................................ F01D 9/04
(52) U.S. Cl. ................................. 415/208.2; 415/211.2
(58) Field of Search ............................. 415/208.3, 208.4, 415/208.1, 208.2, 211.2, 914

(56) References Cited

U.S. PATENT DOCUMENTS

| 3,184,152 A | * | 5/1965 | Bourquard ................... 415/181 |
| 3,333,762 A | | 8/1967 | Vrana ........................... 415/207 |
| 3,644,055 A | | 2/1972 | Davis ........................ 415/208.3 |
| 3,765,792 A | * | 10/1973 | Exley .......................... 415/181 |
| 4,012,166 A | | 3/1977 | Kaesser et al. .............. 415/181 |
| 4,027,997 A | | 6/1977 | Bryans ......................... 415/207 |
| 4,354,802 A | * | 10/1982 | Nishida et al. .............. 415/207 |
| 4,395,197 A | * | 7/1983 | Yoshinaga et al. ........ 415/208.3 |
| 4,431,374 A | | 2/1984 | Benstein et al. ............. 415/211 |
| 4,576,550 A | | 3/1986 | Bryans ......................... 415/211 |
| 4,696,622 A | | 9/1987 | Traczyk et al. .............. 415/211 |
| 4,877,370 A | * | 10/1989 | Nakagawa et al. .......... 415/148 |
| 5,310,309 A | * | 5/1994 | Terasaki et al. .......... 415/208.3 |
| 5,387,081 A | | 2/1995 | LeBlanc .................... 415/208.1 |
| 5,709,531 A | * | 1/1998 | Nishida et al. ........... 415/208.2 |

* cited by examiner

Primary Examiner—Edward K. Look
Assistant Examiner—Richard A. Edgar
(74) Attorney, Agent, or Firm—Nathan D. Herkemp; Alfred J. Mangels

(57) ABSTRACT

A diffuser for a centrifugal compressor in which the diffuser has a plurality of passageways that each include a diffuser inlet region, a diffuser throat region, and a diffusion region. Within the diffuser inlet region are positioned pairs of opposed ridges that disrupt the boundary layer growth and minimize aerodynamic blockage at the throat region. The diffusion region includes a first diffusion region downstream of the throat region and that has a first area expansion ratio, and the second diffusion region that includes flow dividers to allow a total area expansion rate within the second diffusion region that is about twice that of the area expansion rate in the first diffusion region.

20 Claims, 5 Drawing Sheets

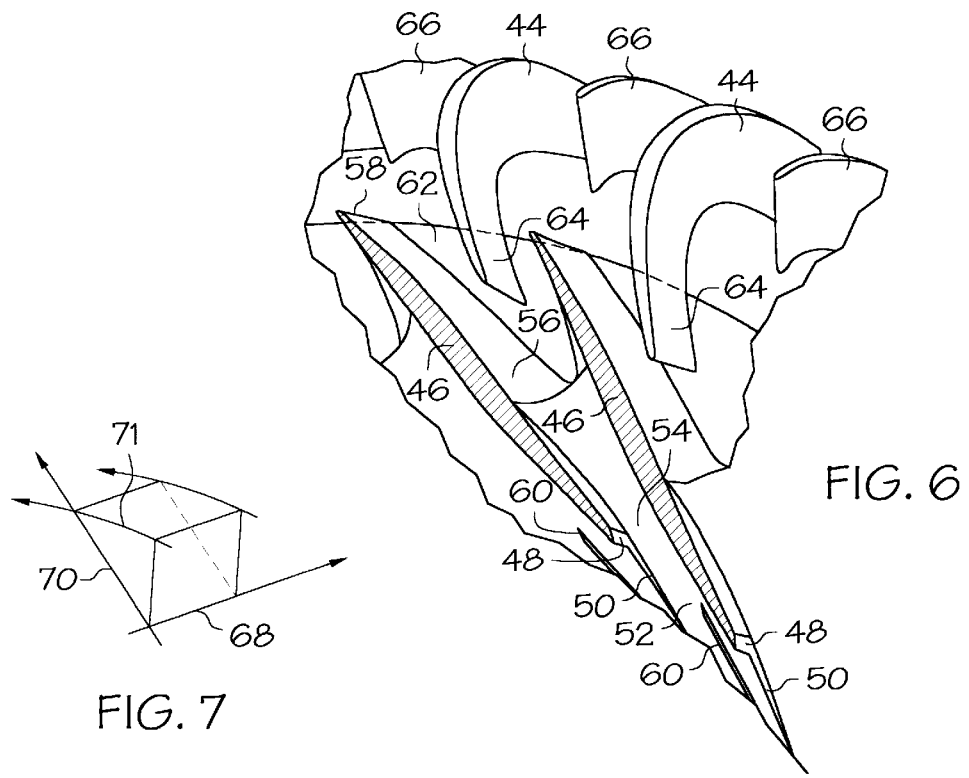
FIG. 6
FIG. 7
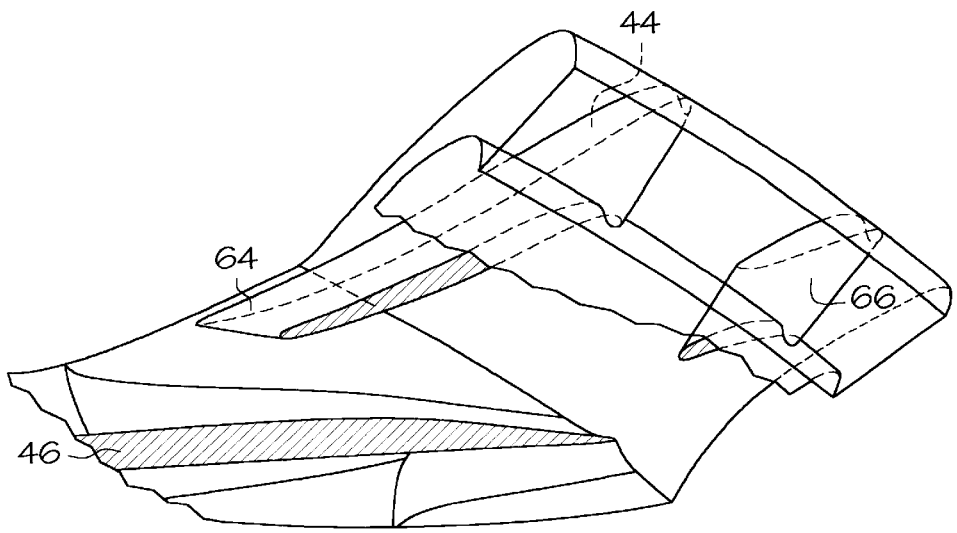
FIG. 8
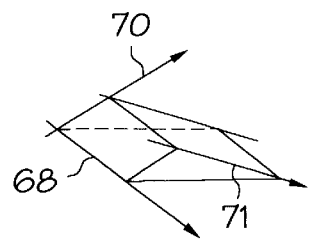
FIG. 9

DIFFUSER FOR A CENTRIFUGAL COMPRESSOR

BACKGROUND OF THE INVENTION

The present invention relates to a diffuser system for centrifugal compressors in which the air that is discharged from the rotating impeller is turned both radially and axially with fewer losses. More particularly, the present invention relates to a diffuser having improved diffuser recovery by minimizing boundary layer build-up that would otherwise partially block the diffuser flow passageway, and also one having reduced total pressure loss.

Centrifugal compressors are often utilized in gas turbine engines to raise the pressure of the incoming air before it enters a combustion chamber, within which the air is mixed with fuel and the fuel-air mixture is ignited to provide output power in the form of jet thrust or shaft horsepower. Such compressors generally include a rotatable, disk-like impeller that has on its upstream face a plurality of substantially radially-extending impeller blades. The impeller is contained within a casing that defines an inlet opening at the hub of the impeller and an outlet opening adjacent the impeller periphery. Between the impeller periphery and the compressor outlet opening there is provided a diffuser for receiving the air that is centrifugally discharged from the rotating impeller at a high velocity, to convert the kinetic energy of the air leaving the impeller into increased static pressure, and simultaneously to turn the airflow from a substantially tangential direction, relative to the impeller, to one that has a major velocity component in the axial direction of the compressor.

It has been found that much of the efficiency losses of centrifugal compressors occur in the diffuser system. Those losses arise as a consequence of the need to reduce the velocity of the air that leaves the rotating impeller, and the need to remove from the flow stream the high degree of swirl by turning the flow stream into a generally axial direction. Simultaneously, the flow is turned from a radially outward direction, at which it leaves the impeller periphery, to a generally inward direction toward the compressor longitudinal axis, so the high pressure air can be introduced at a relatively low velocity into the combustor that is axially downstream of the compressor.

With respect to the velocity reduction, the Mach number of the flow at the impeller exit is generally in the transonic range, from about 0.9 to about 1.2, and that Mach number must be reduced at the combustor inlet to a value typically of about 0.1. Along with the velocity reduction, the swirl from the impeller periphery, which can be an angle of the order of from about 65° to about 76°, is reduced so that it is not greater than about 5° at the combustor inlet. Additionally, the airflow must be turned from a generally radially outward flow direction to a substantially axially and radially inward flow direction, which oftentimes involves turning the airflow through an angle of from about 90° to about 140°.

Those velocity and directional changes are generally accomplished by providing a diffuser in which the air flows through a diverging passageway to reduce the velocity, an axisymmetric bend to turn the flow from radially outward to substantially axial, and also a deswirler cascade of turning vanes to turn the flow into an axial direction. In the course of slowing and redirecting the airflow, the diffuser and deswirler systems contribute losses that are largely inherent in such arrangements, and also additional losses that occur as a result of build-up of a boundary layer within the diffuser, which operates to constrict the flow through the diffuser and thereby reduce its efficiency.

The present invention serves to improve the efficiency of centrifugal compressor diffusers by reducing aerodynamic blockage to improve diffuser recovery, and by reducing the total pressure loss by providing a diffuser expansion area ratio that is substantially an optimum value.

SUMMARY OF THE INVENTION

Briefly stated, in accordance with one aspect of the present invention, a diffuser is provided for a centrifugal compressor that includes an impeller rotatably carried within a casing. The diffuser includes a plurality of diffuser passageways that have their respective longitudinal axes disposed tangentially to an imaginary circle that has its center coincident with the impeller axis. The diffuser passageways include a diffuser inlet region that commences adjacent the impeller periphery, a diffuser throat region that is downstream of the diffuser inlet region, and a diffuser outlet region that is downstream of the diffuser throat region. The diffuser passageways are each bounded by a pair of circumferentially spaced diffuser panels having respective leading edges adjacent the impeller periphery and that lie on a diffuser leading edge circle. The diffuser panels also have trailing edges that are spaced radially outwardly of and circumferentially offset from the leading edges and that lie on a diffuser trailing edge circle. At least one ridge is provided that extends substantially longitudinally relative to and within the diffuser inlet region between the impeller periphery and the diffuser leading edge circle. The at least one ridge also extends inwardly into the diffuser passageway and is positioned between and is spaced from the leading edges of adjacent diffuser panels. The ridges serve to mix air that leaves the impeller and that enters the diffuser passageway to reduce boundary layer build-up upstream of the diffuser throat region.

In accordance with another aspect of the present invention, the diffuser outlet regions include splitter vanes that divide the flow adjacent the exit to the diffuser outlet region. Providing such splitter vanes permits a larger overall expansion ratio in the region in which the splitter vanes are provided. Moreover, the splitter vanes serve as deswirler vanes to reduce the tangential flow component of the air that exits from the diffuser.

In accordance with further aspect of the present invention, deswirler splitter vanes can be provided in the deswirler section of the compressor outlet to aid in efficiently turning the flow into an axial direction.

BRIEF DESCRIPTION OF THE DRAWINGS

The structure, operation, and advantages of the present invention will become further apparent upon consideration of the following description, taken in conjunction with the accompanying drawings in which:

FIG. 6 is a fragmentary perspective view looking aft from the compressor inlet and showing a pair of diffuser panels and downstream deswirler vanes.

FIG. 7 is an orientation diagram showing the direction of the engine axis and other directions for the structure shown in FIG. 6.

FIG. 8 is a fragmentary perspective view looking forward from a point downstream of the compressor discharge.

FIG. 9 is an orientation diagram showing the direction of the engine axis and other directions for the structure shown in FIG. 8.

DETAILED DESCRIPTION OF THE INVENTION

Figure 1:
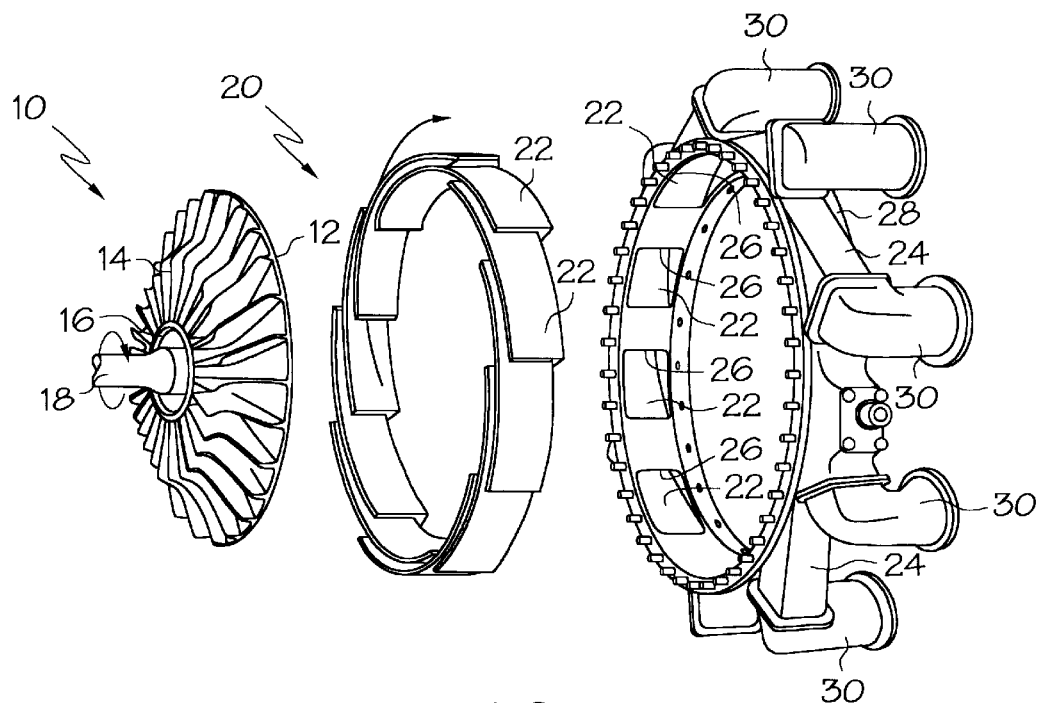
FIG. 1 is an exploded view of one known form of centrifugal compressor.
Figure 2:
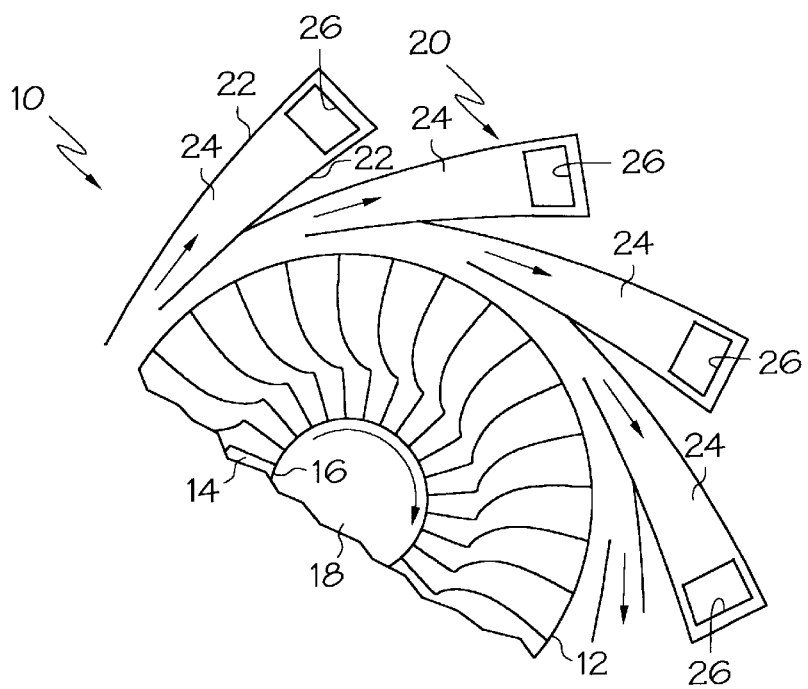
FIG. 2 is a fragmentary front elevational view of the centrifugal compressor shown in FIG. 1.

Referring now to the drawings, and particularly to FIGS. 1 and 2 thereof, there is shown one form of known centrifugal compressor 10 suitable for use in an aircraft gas turbine engine. Compressor 10 includes an impeller disk 12 that carries a plurality of generally radially-extending impeller blades 14 that radiate outwardly from a central hub 16. A drive shaft 18 extends through hub 16 and is drivingly coupled with a turbine (not shown) that is driven by heated combustion products from combustion that occurs in a combustor (not shown) positioned between the compressor and the turbine.

Radially outward of impeller disk 12 and in longitudinal alignment with outermost edges of the respective impeller blades 14 is a diffuser 20 that is defined by a plurality of curved, radially positioned, partially overlapped but tangentially spaced panels 22 that define diffuser passageways 24 therebetween. The inlets of diffuser passageways 24 each open to and communicate with the annular space at the outer periphery of impeller disk 12, and the outlets of diffuser passageways 24 open to and communicate with respective discharge openings 26 provided in an outer casing 28. Discharge openings 26 have connected thereto a respective elbow 30 that serves to turn the flow from a swirling, rotational direction to a circumferentially-arranged series of axially-rearwardly-directed flows that are adapted to flow into the gas turbine combustor (not shown).

In the operation of the centrifugal compressor, impeller disk 12 is rotated, in a clockwise direction as shown in FIGS. 1 and 2, so that air is drawn into the impeller at an annular area at central hub 16 that is sometimes referred to as the "eye" of the compressor impeller. When impeller disk 12 is rotated, impeller blades 14 impart rotational motion to the incoming air, which is directed radially outwardly along impeller blades 14 by virtue of centrifugal force. When the air within the impeller reaches the outermost radial ends of impeller blades 14, at the periphery of impeller disk 12, the air has an absolute velocity, relative to the compressor longitudinal axis, that is in a direction that extends angularly relative to impeller disk 12. Thus, the air leaving the impeller has a radial velocity component as well as a tangential velocity component, which together provide a resultant velocity vector that is at an angle that can be of the order of from about 65° to about 76°.

The swirling air that leaves blades 14 of the rotating impeller flows into the respective diffuser passageways 24, which by virtue of their diverging flow area reduce the absolute velocity of the air, thereby transforming part of the kinetic energy of the air into higher static pressure. The reduced velocity air is then turned through an angle greater than 90° and flows into the combustor.

Although shown as having a plurality of circumferentially-spaced discharge openings 26 and interconnected elbows 30, the compressor outlet area can be so configured that the air leaving the diffuser flows instead into an annulus with interiorly positioned flow straightening vanes (not shown), to turn the flow from the transverse, generally tangential direction to a substantially axial direction.

Figure 3:
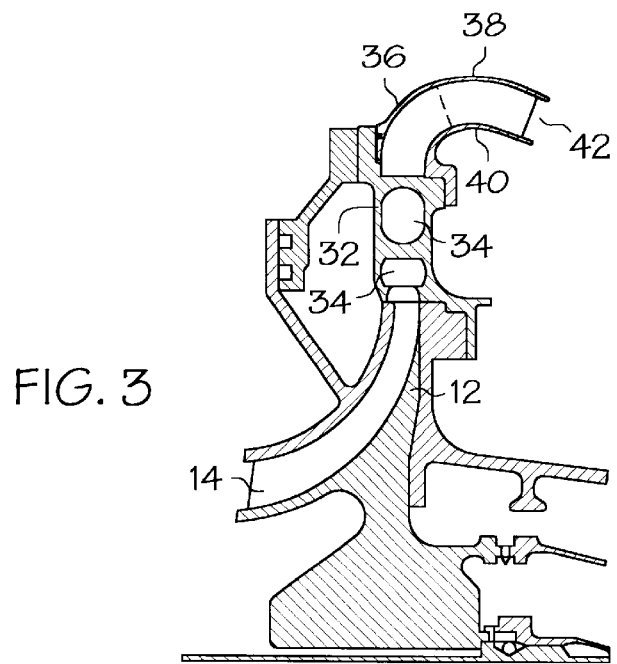
FIG. 3 is a fragmentary longitudinal cross-sectional view of a centrifugal compressor showing an embodiment of the present invention.
Figure 4:
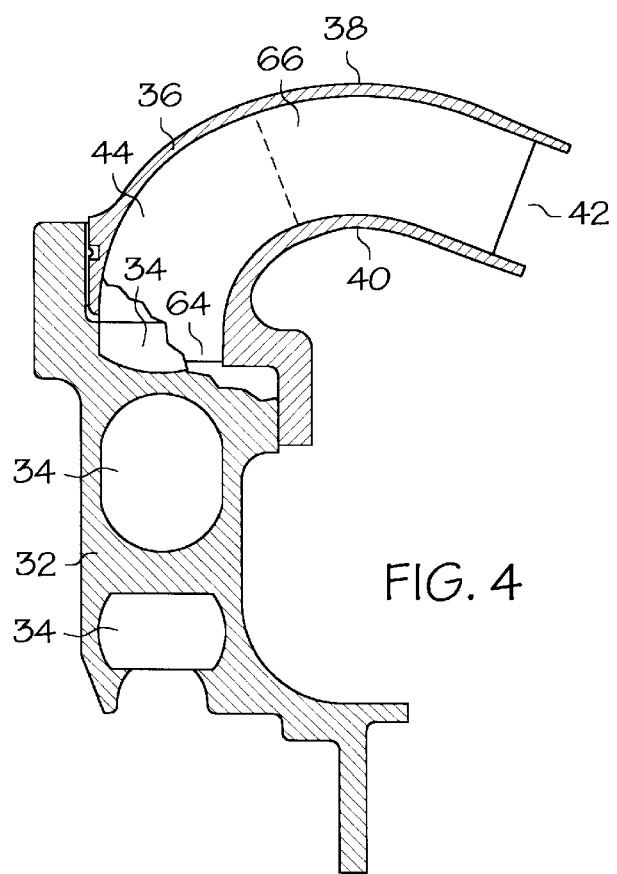
FIG. 4 is an enlarged, fragmentary, longitudinal cross-sectional view of the centrifugal compressor diffuser section of the compressor shown in FIG. 3.

An embodiment of an improved centrifugal compressor diffuser that has a high efficiency, by virtue of incorporating elements that operate to reduce the flow losses that frequently occur in the prior art diffuser structures, is shown in FIGS. 3 and 4. A stationary diffuser housing 32 is positioned radially adjacent the exit openings of impeller blades 14 to receive the airflow as it leaves the impeller. Diffuser housing 32 includes a plurality of diffuser passageways 34, each of which extends as a tangent to an imaginary circle that has its center coincident with the impeller axis. Each of diffuser passageways 34 is in partially overlapped relationship with adjacent diffuser passageways, similar to the diffuser passageway positioning shown in FIGS. 1 and 2, and thus the longitudinal cross-sectional views of FIGS. 3 and 4 each show portions of two adjacent, partially overlapping diffuser passageways 34.

Positioned radially outwardly of diffuser housing 32 is an annular casing 36 that is defined by a curved outer wall 38 and a corresponding curved inner wall 40 that is spaced radially inwardly of outer wall 38. Outer and inner walls 38, 40 together define an outlet flow passageway 42 that is of annular, axisymmetric form. Flow passageway 42 serves to turn the airflow leaving the diffuser passageways 34 so that the radial velocity component of the airflow is turned through an angle greater than 90°, to flow in a generally axial direction relative to the compressor longitudinal axis.

Flow passageway 42 also includes a plurality of generally radially extending and circumferentially spaced turning vanes 44 that are provided to turn the flow that exits from diffuser passageways 34 into a substantially axial direction from the generally tangential direction of the flow as it leaves the respective diffuser passageways 34 and flows through outlet passageway 42.

Figure 5:
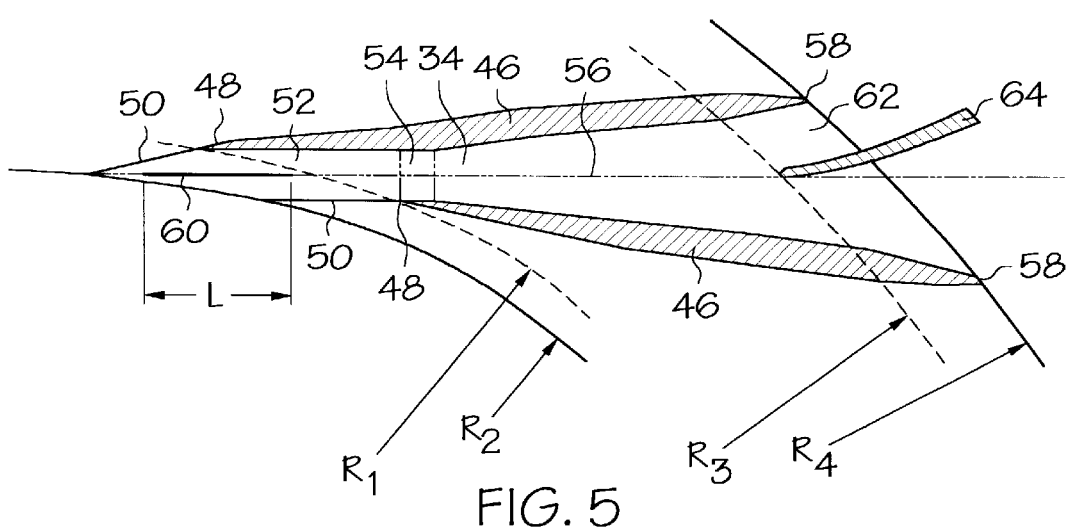
FIG. 5 is a longitudinal cross-sectional view through two adjacent diffuser panels for the diffuser shown in FIG. 4.

A diffuser passageway 34 is shown in greater detail in FIG. 5, which is a fragmentary, transverse cross-sectional view through diffuser housing 32. FIG. 5 shows one pair of adjacent, spaced diffuser panels 46 that define therebetween a diffuser flow passageway 34. It should be understood that diffuser housing 32 includes a plurality of diffuser panels that are substantially equally circumferentially distributed within the diffuser housing. Each diffuser panel 46 includes a leading edge 48 that extends in a generally axial direction relative to the compressor longitudinal axis, and the several diffuser panel leading edges lie on an imaginary circle that has a radius $R_1$ as shown. The impeller periphery has a smaller radius $R_2$ that results in an annular gap between the impeller periphery and the diffuser panel leading edges 48, the gap having a radial dimension $R_1-R_2$. Within the annular gap are a series of axially-extending ledges 50, each of which is a partial extension of the leading edge 48 of a diffuser panel 46, but which extends only partially across the entire axial dimension of diffuser panel 46, as best seen in FIG. 6, and can have an axial extent of up to about 25% of the height of diffuser panel 46. The purpose of ledges 50 is to provide a projection that extends into the flow stream for disrupting the boundary layer as the flow stream passes from the impeller to between diffuser panels 46, and thereby cause the formation of flow vortices that enhance mixing of the boundary layer and the main flow field.

Diffuser passageway 34 includes a diffuser inlet region 52 that extends from the impeller periphery to a constant cross-sectional area diffuser throat region 54. Because ledges 50 do not extend completely across the flow passageway, diffuser inlet region 52 is not a completely bounded passageway. Diffuser throat region 54, on the other hand, is a bounded passageway, and the constant area throat portion can extend for a longitudinal distance of about 50% of the passageway width. Immediately downstream of diffuser throat region 54 is a first diffusion region 56, within which the axially-extending diffuser wall surfaces defined by diffuser panels 46 diverge from each other in a downstream direction. The included angle of divergence between adjacent diffuser wall surfaces in first diffusion region 56 is selected to be an included angle of the order of from about 6° to about 8°, to provide sufficient velocity reduction of the consistent with minimal accompanying pressure loss due to flow separation from the diffuser wall surfaces, which could occur if the divergence angle were significantly larger. As shown in FIG. 5, the trailing edges 58 of diffuser panels 46 lie on a circle having a radius designated by $R_4$.

Positioned within diffuser inlet region 52 is a ridge 60 that extends substantially linearly and into diffuser inlet region 52. Ridge 60 is positioned at a point within diffuser passageway 34 intermediate adjacent ledges 50. Ridge 60 extends from a point adjacent to but radially outward from the impeller periphery into the diffuser inlet region for a length L to terminate at a point upstream of the diffuser throat region. As shown in FIG. 5, the downstream end of ridge 60 lies inwardly of an imaginary circle having a radius $R_1$ and passing through diffuser panel leading edges 48, as shown in FIG. 5.

As also shown in FIG. 5, positioned downstream of first diffusion region 56 is a second diffusion region 62. Within second diffusion region 62 is a flow divider 64 that extends inwardly of an imaginary circle having a radius $R_4$ and passing through the diffuser panel trailing edges 58 adjacent the downstream exit opening of the diffuser. Flow divider 64 extends into second diffusion region 62, and its leading edge lies on an imaginary circle having a radius $R_3$ that is smaller than radius $R_4$. The imaginary circle having the radius $R_3$ thus divides the diffusion region into a first, upstream diffusion region 56 that extends from the diffuser throat region to points that lie on the circle having the radius $R_3$. The region downstream and outward of the imaginary circle having the radius $R_3$ and lying between that circle and the imaginary circle having the radius $R_4$ defines second diffusion region 62.

First diffusion region 56 has a divergence included angle that defines a first diffusion region. Within second diffusion region 62, diffuser panels 46 have opposed surfaces that diverge outwardly at a greater divergence included angle, to thereby define a diffusion region where the overall rate of area expansion is greater than that of the first diffusion region. However, because flow divider 64 extends into second diffusion region 62, the effective divergence included angles in each portion of second diffusion region 62 can be made to be no larger than that of first diffusion region 56. As a result, the rates of area expansion in each diffusion region can be maintained at a desirable value for optimum diffusion with lower losses. Thus, more effective conversion of the flow velocity into pressure head can be achieved, and in a shorter length diffuser to thereby result in a smaller frontal area for the compressor casing, which is a desirable attribute in an aircraft engine application.

Flow divider vanes 64 are the upstream portions of turning vanes 44. As shown in FIG. 4, turning vanes 44 extend within outlet passageway 42 for turning the flow from a generally tangential direction relative to the compressor longitudinal axis into a substantially axial direction relative to that axis.

FIGS. 6 and 8 show in three-dimensional form the diffuser passageway defined by diffuser panels 46 and turning vanes 44 that extend into the diffuser passageway. Also shown in FIGS. 6 and 8 are splitter vanes 66 that are provided in the downstream region of outlet passageway 42. Splitter vanes 66 serve to further divide the flow into additional flow streams and to assist in turning them into a substantially axial direction.

The orientation of the elements in FIG. 6 is based upon FIG. 7, which shows the direction of the compressor axis 68, the compressor radial direction 70, and the tangential direction 71 for the several elements shown in FIG. 6. Similarly, FIG. 9 shows for FIG. 8 the directions along which the compressor axis 68 lies, the radial direction 70, and the tangential direction 71.

Figure 12:
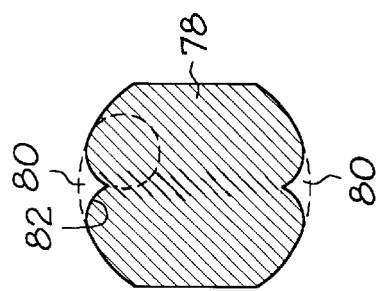
FIG. 12 is a cross-sectional view taken along the line 12—12 of FIG. 10.
Figure 11:
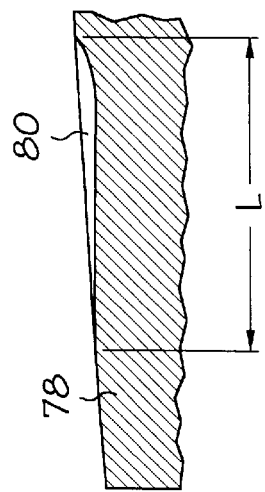
FIG. 11 is a fragmentary cross-sectional view taken along the line 11—11 of FIG. 10.
Figure 10:
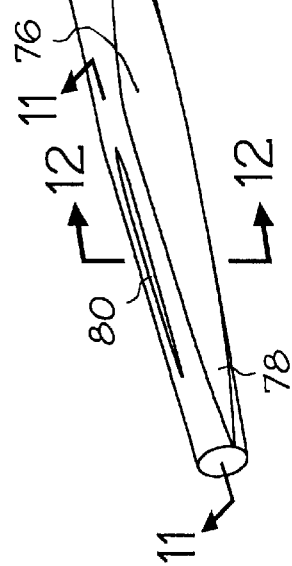
FIG. 10 is a front perspective view of an EDM electrode for forming a diffuser passage of the type shown in FIGS. 4, 5, and 6.

The diffuser passageway shown in FIG. 5 can be formed by an EDM electrode 72 that is shown in perspective view in FIG. 10. Electrode 72 is an elongated body that includes a rearwardly diverging portion 74 for forming the diffusion sections 56 and 62 of the diffuser passageway, a constant area throat portion 76 for forming the throat area of the diffuser passageway, and a forwardly converging portion 78 for forming the diffuser inlet region. Inwardly extending ridges 60 within inlet region 52 of the passageway can be formed by providing recesses 80 in the electrode surface in forward converging portion 78. As best seen in FIGS. 11 and 12, ridges 60 are formed by opposed recesses 80 in the electrode, the recesses having curved sides that join to define a cusp 82 that extends into the forward diverging portion of the electrode. As shown in FIG. 11, the recess height tapers along the electrode axis so that the recess bottom is substantially parallel to the electrode axis. Also as shown in FIG. 11, in the downstream region adjacent to the constant area throat portion 76, the depth of recess 80 rapidly diminishes to zero at a point immediately upstream of the constant area throat region.

Those skilled in the art will thus appreciate that the present invention as hereinabove disclosed and as shown in the several drawings can provide improved and more efficient operation of a centrifugal compressor diffuser.

Although particular embodiments of the present invention have been illustrated and described, it will be apparent to those skilled in the art that various changes and modifications can be made without departing from the spirit of the present invention. Accordingly, it is intended to encompass within the appended claims all such changes and modifications that fall within the scope of the present invention.

What is claimed is:

1. A diffuser for a centrifugal compressor that includes an impeller rotatably carried within a casing, said diffuser comprising:

a plurality of substantially linearly-extending diffuser passageways having respective longitudinal axes disposed tangentially to an imaginary circle having its center coincident with the impeller axis, the diffuser passageways including a diffuser inlet region commencing adjacent the impeller periphery, a diffuser throat region downstream of the diffuser inlet region, and a diffuser outlet region downstream of the diffuser throat region, wherein the diffuser passageways are each bounded by a pair of circumferentially spaced diffuser panels having respective leading edges adjacent the impeller periphery and that lie on a diffuser leading edge circle, and trailing edges spaced radially outwardly of and circumferentially offset from the leading edges and that lie on a diffuser trailing edge circle; and a pair of opposed ridges extending substantially longitudinally relative to and within the diffuser inlet region between the impeller periphery and the diffuser leading edge circle, each ridge varying in height along the diffuser inlet region and extending partially inwardly into the diffuser passageway, wherein the ridges are positioned between and are spaced from the leading edges of adjacent diffuser panels for mixing of air leaving the impeller and entering the diffuser passageway, to reduce boundary layer buildup within the diffuser passageway upstream of the diffuser throat region.

2. A diffuser in accordance with claim 1, wherein the pair of ridges are substantially parallel with the diffuser passageway longitudinal axis.

3. A diffuser in accordance with claim 1, including ledges that extend partially inwardly into the diffuser inlet region, wherein the ledges extend inwardly relative to the compressor impeller from the diffuser leading edges to promote mixing of air entering the diffuser passageways and to reduce boundary layer build-up.

4. A diffuser in accordance with claim 3, wherein the ledges extend from the diffuser panel leading edges toward the impeller periphery.

5. A diffuser in accordance with claim 1, wherein the diffuser throat region is defined by a constant cross-sectional area section between the diffuser inlet region and the diffuser outlet region.

6. A diffuser in accordance with claim 1, wherein the diffuser outlet region is defined by substantially linear wall surfaces of the diffuser panels.

7. A diffuser in accordance with claim 6, wherein the diffuser wall surfaces diverge at a first divergence included angle.

8. A diffuser in accordance with claim 6, wherein the diffuser outlet region includes a first diffusion region and a second diffusion region.

9. A diffuser in accordance with claim 8, wherein the wall surfaces of the diffuser panels within the second diffusion region define a second divergence included angle.

10. A diffuser in accordance with claim 9, wherein the second divergence included angle is greater than the first divergence included angle.

11. A diffuser in accordance with claim 9, including a flow divider positioned within the second diffusion region.

12. A diffuser in accordance with claim 11, wherein the flow divider is positioned between and is spaced from adjacent diffuser panels to define respective sub-diffusion regions.

13. A diffuser in accordance with claim 12, wherein the sub-diffusion regions together have an expansion area ratio rate that is larger than the area ratio rate in the first diffusion region.

14. A diffuser for a centrifugal compressor that includes an impeller rotatably carried within a casing, said diffuser comprising:

a plurality of substantially linearly-extending diffuser passageways having respective longitudinal axes disposed tangentially to an imaginary circle having its center coincident with the impeller axis, the diffuser passageways including a diffuser inlet region commencing adjacent the impeller periphery, a diffuser throat region downstream of the diffuser inlet region, and a diffuser outlet region downstream of the diffuser throat region, wherein the diffuser outlet region is defined by substantially linear wall surfaces of the diffuser panels and includes a first diffusion region and a second diffusion region, wherein the diffuser passageways are each bounded by a pair of circumferentially spaced diffuser panels having respective leading edges adjacent the impeller periphery and that lie on a diffuser leading edge circle, and having trailing edges spaced radially outwardly of and circumferentially offset from the leading edges and that lie on a diffuser trailing edge circle, wherein the wall surfaces of the diffuser panels within the second diffusion region define a second divergence included angle, including a flow divider positioned within the second diffusion region; and at least one ridge extending substantially longitudinally relative to and within the diffuser inlet region between the impeller periphery and the diffuser leading edge circle, and extending inwardly into the diffuser passageway, wherein the at least one ridge is positioned between and is spaced from the leading edges of adjacent diffuser panels for mixing of air leaving the impeller and entering the diffuser passageway to reduce boundary layer buildup upstream of the diffuser throat region, wherein the diffuser flow divider is carried within an annular outlet passageway extending downstream of the diffuser outlet region.

15. A diffuser in accordance with claim 14, wherein the diffuser flow divider is curved to turn diffuser outlet airflow in a direction substantially parallel to the impeller axis of rotation.

16. A diffuser in accordance with claim 15, wherein the diffuser flow divider extends substantially across a flow channel defined by an inner annular wall and an outer annular wall that is spaced outwardly from the inner annular wall to define the annular outlet passageway.

17. A diffuser in accordance with claim 16, wherein the annular outlet passageway turns air exiting from the diffuser outlet through an angle greater than 90°.

18. A diffuser in accordance with claim 14, including deswirler splitter vanes positioned within the annular outlet passageway and between adjacent diffuser flow dividers.

19. A diffuser in accordance with claim 18, wherein the deswirler splitter vanes extend from an outlet opening in the annular outlet passageway and terminate at a point spaced downstream of the diffuser panel trailing edges.

20. A method for increasing the efficiency of diffusion for diffusing air that exits from the impeller of a centrifugal compressor, said method comprising:

providing a pair of opposed ridges extending substantially longitudinally relative to and within a diffuser inlet region between the impeller periphery and an imaginary circle defined by a plurality of diffuser panel leading edges, each ridge extending partially inwardly into the diffuser inlet region for mixing of air leaving the impeller and entering the diffuser inlet region to reduce boundary layer buildup within the diffuser inlet region;

diffusing impeller outlet air flow in a first diffusion region downstream of the diffuser inlet region through a first passageway area ratio;

dividing outlet flow from the first diffusion region into two flows in a pair of second diffusion regions downstream of the first diffusion region; and diffusing flow within the first diffusion region and within each second diffusion region through substantially the same passageway area ratio.

* * * * *